(No Model.)
R. S. HUGHES.
AMUSEMENT APPARATUS.
No. 511,272. Patented Dec. 19, 1893.
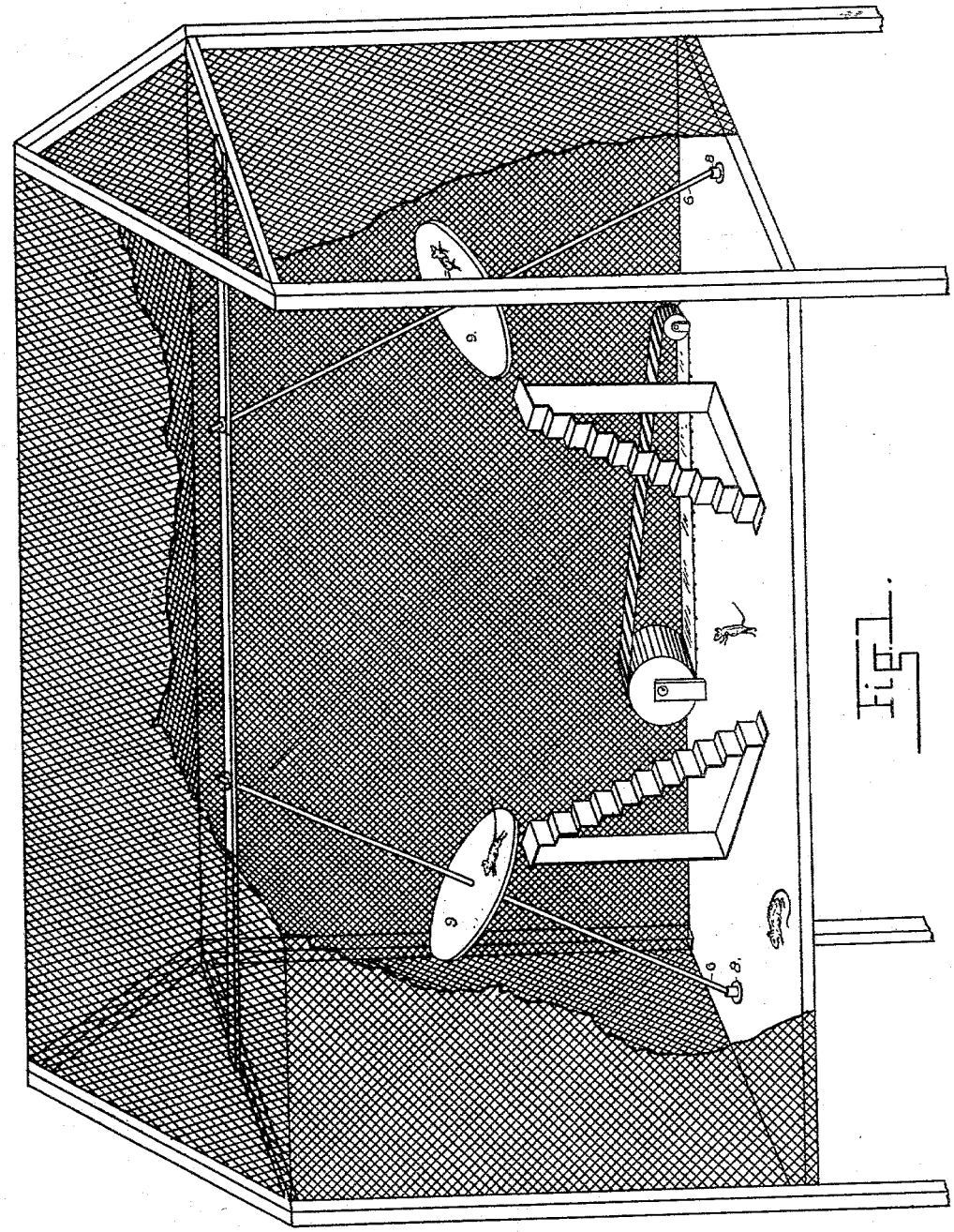
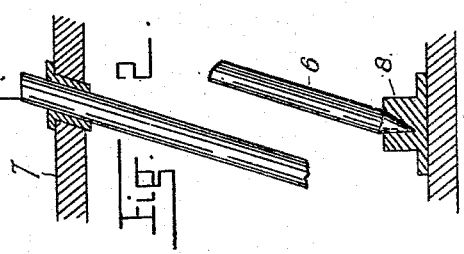

UNITED STATES PATENT OFFICE.

ROBERT S. HUGHES, OF DENVER, COLORADO, ASSIGNOR OF ONE-HALF TO ALEXANDER H. TARBET, OF SAME PLACE.

AMUSEMENT APPARATUS.

SPECIFICATION forming part of Letters Patent No. 511,272, dated December 19, 1893.

Application filed May 31, 1893. Serial No. 476,181. (No model.)

*To all whom it may concern:*

Be it known that I, ROBERT S. HUGHES, a citizen of the United States of America, residing at Denver, in the county of Arapahoe and State of Colorado, have invented certain new and useful Improvements in Amusement Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved amusement apparatus and consists of the features hereinafter described and claimed all of which will be fully understood by reference to the accompanying drawings, in which is illustrated an embodiment thereof.

In the drawings: Figure 1 is a perspective of the mechanism. Fig. 2 illustrates details of construction.

Similar reference characters indicating corresponding parts or elements of the mechanism in these views, let the numeral 5 designate a cage composed preferably of wire screen attached to a suitable framework. Within this cage are located one or more rods 6 which occupy a position inclined to the perpendicular and are pivotally supported in the cage. In the drawings two rods 6 are illustrated, their upper extremities being journaled in a stationary bar 7 supported in the upper part of the cage. The lower extremities of the rods are pivoted in sockets 8 made fast to the bottom of the cage. The manner of pivoting the inclined rods is best illustrated in Fig. 2. To each rod 6 is attached a disk 9 which is made fast to the rod which forms its axis, the plane of the disk being at right angles to the inclined axis. A series of steps resembling a stair case, is supported in proximity to the rods and of such height that the uppermost step or the platform at the top of the series of steps, is quite close to the disk.

Small animals, as mice, are put into this cage. Having climbed the frail stair case they jump upon the disk 9, and as they attempt to climb from the lower to the upper edge of the disks the gravity of their bodies causes the disks to move, and as they continue to climb in their attempt to reach the top, the disk continues the rotation and the mice begin to run, the speed of the disk increasing until the animals become tired and cease their efforts, after which if the disk is moving quite rapidly, the momentum will cause it to make several rotations with the animals thereon. The mechanism thus becomes a means of recreation and exercise for confined animals of the smaller varieties, as well as a source of amusement and attraction for persons. It thus becomes a valuable advertising device when exhibited at a merchant's place of business, since people are first attracted by the device and subsequently become patrons of the establishment. In some kinds of business the transient trade is of considerable importance, and a device of this kind will have a considerable influence with that class of customers.

It is evident that other devices of interest besides the rotating disk, may be added to an apparatus of this description. To illustrate this idea an inclined belt or apron passing around rotatable cylinders located at its extremities is shown in the cage 5. As soon as the animals get upon this movable apron it begins to move for the same reason that the disks are actuated as heretofore described.

It is evident that the disks may be suitably attached to fixed or stationary axes without departing from the principle of the invention or interfering with its utility for the purpose related.

Having thus described my invention, what I claim is—

1. The combination with a suitable cage, of a rotatable disk mounted upon an inclined axis suitably supported and means for approaching the elevated disk as and for the purpose set forth.

2. The combination with a suitable cage of inclined rods suitably supported thereon, rotatable disks mounted on these rods and an elevated platform having steps leading thereto, whereby the disks are accessible from the bottom of the cage, substantially as described.

3. The combination of the inclined rods pivoted in a suitable support, the disks made fast thereto, and having their plane at right angles to their axes or supporting rods, and elevated means for reaching the disks from a suitable platform or support, substantially as described.

In testimony whereof I affix my signature in the presence of two witnesses.

ROBERT S. HUGHES.

Witnesses:
 ALFRED J. O'BRIEN,
 I. M. SALE.